United States Patent [19]

Forslund et al.

[11] Patent Number: 5,222,688
[45] Date of Patent: Jun. 29, 1993

[54] KEYED SPOOL BEARING

[75] Inventors: Robert Forslund; Melvin Matheson, both of Tulsa, Okla.

[73] Assignee: Zebco Corporation, Tulsa, Okla.

[21] Appl. No.: 706,641

[22] Filed: May 29, 1991

[51] Int. Cl.$^5$ .......................... A01K 89/02; F16B 3/00
[52] U.S. Cl. ..................................... 242/246; 403/355
[58] Field of Search .............................. 242/234-240, 242/244, 246, 310; 403/259, 354, 355; 411/163, 164

[56] References Cited

U.S. PATENT DOCUMENTS

| | | | |
|---|---|---|---|
| 1,100,504 | 6/1914 | Taft | 403/354 |
| 2,730,387 | 1/1956 | White | 403/259 |
| 3,088,691 | 5/1963 | Hull | 242/244 |
| 3,396,554 | 8/1968 | Westercamp | 403/355 X |
| 3,469,799 | 9/1969 | Hull | 242/244 |
| 3,481,554 | 12/1969 | Hull | 242/238 |
| 3,778,001 | 12/1973 | Hull | 242/244 |
| 3,797,774 | 3/1974 | Dumbauld | 242/232 |
| 3,836,092 | 9/1974 | Hull | 242/238 |
| 4,544,114 | 10/1985 | Stauffer | 242/270 |
| 4,902,162 | 2/1990 | Watt | 403/354 X |

Primary Examiner—Daniel P. Stodola
Assistant Examiner—Michael R. Mansen
Attorney, Agent, or Firm—Wood, Phillips, VanSanten, Hoffman & Ertel

[57] ABSTRACT

A keyed spool bearing for a fishing reel of the type having a reel frame body or deck plate, there being a forwardly projecting cylindrical support or hub with a cylindrical bore therein on the reel frame body. A cylindrical center shaft bushing having an axial center shaft receiving bore is inserted into the bore of the cylindrical hub with a portion of the bushing extending forwardly from the cylindrical hub. The keyed spool bearing is mounted on the extending portion of the bushing. A line spool having a cylindrical bore of a predetermined diameter is mounted on the spool bearing. The keyed spool bearing has an annular body with an axial bore therein for receiving the forwardly protruding portion of the bushing. An integral key or tab extends axially and rearwardly from the annular body, the tab being configured to be received in a slot in the reel frame to secure the spool bearing against rotation relative to the reel frame upon rotation of the line spool.

10 Claims, 1 Drawing Sheet

KEYED SPOOL BEARING

BACKGROUND OF THE INVENTION

1. Technical Field

The present invention relates generally to fishing reels and more particularly to a structure for fixedly mounting a spool bearing to the frame of a fishing reel.

2. Background Art

In one type of closed-face spinning reel, a reel frame or deck plate has a forwardly projecting integral hub having a bore therein. A bushing having a neck portion and an enlarged head portion has its neck portion inserted into the bore in hub with the head projecting forwardly therefrom. The bushing has an axial bore for receiving a centershaft. A spool bearing is attached to the neck portion of the bushing between the enlarged head portion and the hub. A cylindrical support is integrally formed in the reel frame proximate the base of the hub. A line carrying spool is mounted between the spool bearing and the cylindrical support. The line carrying spool is axially fixed and normally non-rotatable; however, provision is made for limited rotary slippage or "drag" of the spool relative to the reel frame for controlled withdrawal of line from the spool.

The rotary slippage or drag is controlled by a drag brake mechanism including a plurality of clutch elements in the form of C-shaped resilient rings mounted on the hub and disposed in a bore in the line spool. The C-shaped rings are held in place on the hub by the reel frame and the spool bearing. Each C-ring is split and a cam actuator is disposed in the split between opposite faces bounding the split. The cam actuator is arranged, upon rotation, to increase and decrease the effective outer diameter of the C-rings carried on the hub, thereby increasing and decreasing the frictional drag force applied to the spool by the C-rings.

When the drag brake mechanism is adjusted to permit rotation of the normally non-rotatable spool, the spool imparts torsion to the spool bearing. This torsion can be sufficient to cause the spool bearing to rotate relative to the hub. Such rotation is highly undesirable because it causes the drag brake mechanism which is mounted to the spool bearing to become misaligned, disrupting the drag control at high-end and low-end extreme drag settings. Moreover, the torsion may also cause bushing to rotate relative to the hub. Such rotation can lead to the spool bearing separating from the hub, thereby causing the line spool to become disengaged either from the spool bearing or the support surface. Either of these conditions will result in poor performance and eventual failure of the reel.

To overcome the undesirable rotation of the spool bearing and bushing, prior art structures have fixed the spool bearing to the bushing to prevent rotation of the spool bearing relative to the bushing when drag release occurs. The prior art methods of attaching the spool bearing to the bushing include press fitting the spool bearing to the bushing and drilling and pinning the spool bearing to the bushing. Press fitting has been found to not always hold the spool bearing securely. Drilling and pinning the spool bearing has proven excessively costly. Moreover, neither of these solutions assure the bushing will not be rotated relative to the reel body.

The present invention is directed toward overcoming one or more of the problems attaching a spool bearing to the reel body discussed above.

SUMMARY OF THE INVENTION

The present invention is directed to an improved spool bearing for a fishing reel of the type including a reel frame body having a cylindrical support or hub with a cylindrical bore therein projecting forwardly from the reel frame body. A cylindrical bushing having a center shaft receiving axial bore is inserted into the bore of the cylindrical hub with a portion of the bushing extending forwardly of the reel from the hub. The bushing has a spool bearing mounted on its extending portion adjacent the hub. The reel further includes a line spool having a cylindrical bore of a predetermined diameter mounted on the spool bearing. The improved spool bearing has an annular body with an axial bore therein for receiving the forwardly extending portion of the bushing. A key or tab extends from the annular body, the tab being configured to be received into a slot in the reel frame to secure the spool bearing and the bushing from rotation relative to the reel frame upon rotation of the line spool.

More specifically, the forwardly facing edge of the hub has an axial slot for receiving a bearing tab extending axially and rearwardly from the annular body. In addition, the annular body can have at least two radially spaced tabs extending axially and rearwardly therefrom. The spool bearing may be made of acetal.

The keyed or tabbed spool bearing of the present invention provides a highly reliable structure for positively securing the spool bearing and the bushing against rotation upon rotation of the line spool. Thus, the keyed spool bearing of the present invention provides a structure that helps assure the proper operation and prevents failure of the fishing reel within which it is employed. Yet, the keyed spool bearing of the present invention accomplishes these results in a manner requiring minimal design changes to both the spool bearing and the reel frame currently used in the art. As a result, the keyed spool bearing is inexpensive to manufacture and implement in existing fishing reels. Moreover, employing the keyed spool bearing of the present invention adds no new parts or assembly steps to the building of fishing reels within which it is employed, rendering it significantly cheaper than drilling and pinning, the positive means of securing the spool bearing known in the prior art.

DETAILED DESCRIPTION OF THE PREFERRED EMBODIMENT

Figure 1:
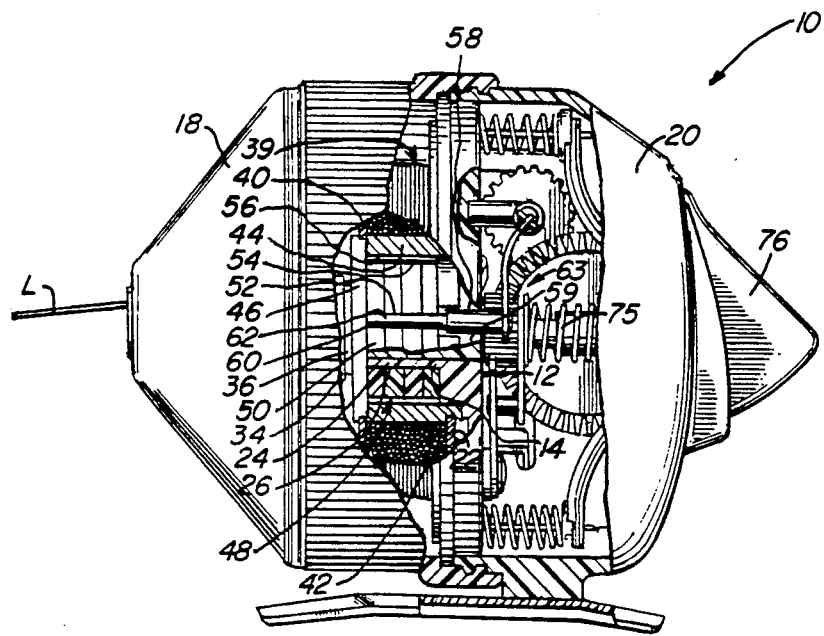
FIG. 1 is a side elevation view of a closed face spinning reel with parts broken away to show the location and structure of a spool bearing according to the present invention.

A fishing reel 10 includes a cylindrical reel frame body/deck plate 12 having an integral, stepped cylindrical hub or support 14 extending forwardly from its front face 16. The reel frame 12 is captively held between a threadably engaged cup-shaped front cover 18 and a cup-shaped back cover 20. The forwardly projecting cylindrical hub 14 has an annular line spool supporting surface 22 and a reduced diameter portion 24 which provides a clutch ring support surface 26. An axial bore 28 extends fully through the hub 14 and reel frame 12.

A bushing 30 has a cylindrical neck portion 32 and a cylindrical enlarged head portion 34. An annular flange 36 is located between the neck portion 32 and the enlarged head portion 34. A through bore 37 runs axially through the bushing 30, the through bore 37 being configured to slidably receive a center shaft 38. The neck portion 32 of the bushing 30 is inserted into the cylindrical bore 28 in the cylindrical hub 14 with the enlarged head portion 34 of the bushing 30 extending forwardly from the cylindrical hub 14.

A line spool 39 having front and back radial flanges 40, 42 and an arbor 44, is adapted to frictionally engage the supporting surface 22 and a forward spool bearing 46 in a normally non-rotatable manner. The supporting surface 22 and the spool bearing 46 bound an annular groove 48 in which four expandable clutch rings 50 are disposed. As appreciated by those skilled in the art, any number of clutch rings may be suitable, depending upon the range and magnitude of drag required to be created by the clutch rings 50. Each ring 50 comprises a "closed C-shaped" member made of resilient, flexible plastic material. Acetal is a preferred material. A slot 52 extends radially through the rings 50 and provides it with its C-shaped appearance. The outer surfaces of the C-rings 54 are adapted to bear against spaced inner surface areas 56 of the spool arbor 44 with varying degrees of force to accommodate limited, controlled rotation of the line spool 39 about the supporting surface 22 and the spool bearing 46. The spool is axially fixed with respect to the front face of the reel frame 16 by conventional means (not shown) such as a spring clip which may be snapped on to the bushing 30. The spring clip rests upon the flange 36 and between the rearwardly facing end 57 of the enlarged head portion 34 and a forwardly facing portion of the spool 39.

The clutch rings 50 are expanded through a clutch shaft 58 which extends axially through hole 59 in the reel frame and into the slots 52 of the rings 50. The far end 60 of the clutch shaft 58 is inserted into a hole 61 in the spool bearing 46. The clutch shaft 58 includes an eccentric portion 62 (with respect to the slot 52) having an oblong crosssection. Actuating means 63 are connected to the clutch shaft 58. As explained in detail in Hull, U.S. Pat. No. 3,778,001, the actuating means 63 causes the clutch shaft 58 to rotate relative to the reel frame 12 which causes the clutch rings 50 to expand or contract, thus increasing or decreasing the frictional force upon the spool arbor 44 to provide a desired amount of "drag" or resistance to slippage of the spool arbor 44 about the line spool support surface 22 and the spool bearing 46. FIG. 1 is in fact a modified version of FIG. 1 of the above referenced Hull patent.

Figure 2:
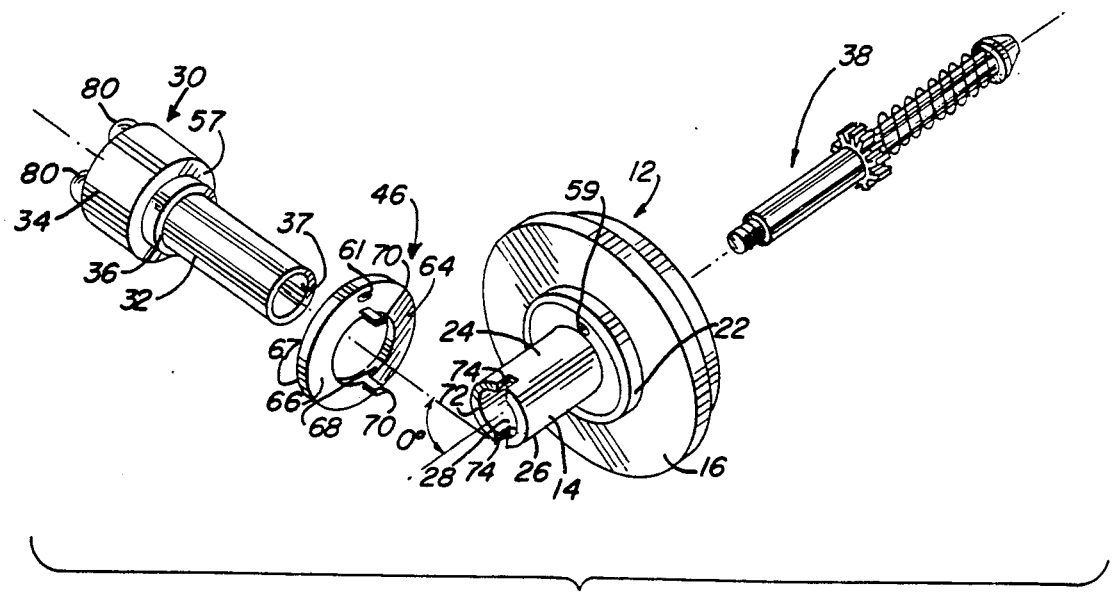
FIG. 2 is an exploded, perspective view of the reel frame body, bushing, centershaft and keyed spool bearing of the present invention with the drag mechanism omitted for clarity.

The present invention is directed to the spool bearing 46 and a structure for maintaining the spool bearing 46 in a non-rotatable position relative to the frame 12. As best seen in FIG. 2, the spool bearing 46 has an annular body 64 having a rearwardly facing surface 66 and a forwardly facing surface 67. An axial bore 68 extends through the annular body from front to back. The axial bore 68 is of a diameter such that the neck portion 32 of the bushing 30 may be forcibly inserted therein. The spool bearing 46 is press fit upon the neck portion 32 of bushing 30 and against the enlarged head 34 of the bushing 30, or more particularly, against the flange 36 of the bushing 30. A pair of tabs or keys 70 extend axially and rearwardly from the rearwardly facing surface 66 of the spool bearing 46. The tabs 70 are of a size such that they may be axially inserted into a pair of forwardly facing notches 74 in the forwardly facing edge 72 of the cylindrical hub 14 so that a keyed connection is established which prevents relative rotation between the bushing 30, bearing 46, and the reel frame body 12. The number of keys and corresponding notches may be any number greater than one and multiple keys and corresponding notches are preferably radially spaced and equidistance from each other.

The spool bearing 46 including the tabs or keys 70 are preferably integrally formed of a resilient, flexible plastic material. Acetal is a preferred material.

Operation of the fishing reel 10 described above is explained in detail in Hull, U.S. Pat. No. 3,481,554. Briefly, the centershaft 38 is biased rearwardly by the spring 75. Depression of a thumb button 76 by a user pushes the centershaft 38 forward relative to the reel body 16. A spinner head (not shown) attached to a forward threaded end 78 of the centershaft 38 is thereby pushed forward against an inside, rearwardly facing surface on the front cover 18. The line L is then trapped between the spinner head and the front cover 18 to prevent the line L from being payed out from the spool 39. Forward displacement of the spinner head also causes a pickup pin (not shown), which normally projects radially through the spinner head, to be withdrawn to thereby allow the line to freely uncoil from the spool 39. When the line is cast forward, the user releases the thumb button 76, causing the spinner head to move rearwardly relative to the front cover 18 by action of the spring 75, thereby allowing the line L to be withdrawn from the line spool 39. After the line L has been payed out, the reel operator handle is rotated which causes the pickup pin on the spinner head to project through the spinner head to thereby pick up the line L. A pair of cams 80 on the enlarged head portion 34 of the bushing 30 engage the pickup pin and wedge the pickup pin out as the transition is effected from the cast mode to the retrieve mode.

Retrieval of the line is effected by continuing rotating of the centershaft 38 by means of the crank handle. Rotation of the centershaft 38 will cause rotation of the spinner head, causing the pickup pins to wind the line L onto the spool 39.

During line retrieval or while line is payed out, excessive forces may be exerted on the line by a hooked fish, a snagged object, or the like. As should be appreciated, the C-rings 50 accommodate limited, controlled slippage or rotation of the spool 39 about the clutch ring support surface 26 and the spool bearing 46 and the line spool supporting surface 22. It is during this slippage that the torsion applied to the spool bearing 46 may cause the spool bearing 46 or the bushing 30 to rotate relative to the reel frame 12. If the spool bearing 46 is caused to rotate, the clutch shaft 58 will be rotated with it because the far end 60 of the clutch shaft 58 is inserted in the hole 61 in the spool bearing 46. This rotation of the clutch shaft 58 will cause some of the C-rings 50 to be expanded, thus altering the amount of drag independent of the actuating means 63. The disruption is particularly acute at the high-end and lowered extreme drag settings.

With the present inventive spool bearing, when the fishing reel 10 is fully assembled, the spool bearing 46 is press fit on the neck portion 32 of the bushing 30 and located adjacent the enlarged head 34 (or more particularly, the annular flange 34) of the bushing 30. The neck portion 32 of the bushing 30 in turn is inserted in the cylindrical bore 28 in the reduced diameter portion 24 of the cylindrical hub 14 and held therein by a friction fit. A plurality of C-rings 50 (which may be four as illustrated in FIG. 1) are disposed on the reduced diameter portion 24 of the cylindrical hub 14 and are held in place by the deck plate 12 and the rearwardly facing surface 66 of the spool bearing 46. The tabs or keys 70 engage the axial slot 74 in the forwardly facing edge 72 of the cylindrical hub 14.

When the C-rings 50 of the reel 10 are in an unexpanded position such that the line spool 38 may rotate against the pay out of line L, a torsional force is exerted on the spool bearing 46 and the line spool support surface 22 due to frictional forces between the front and back radial flanges 40,42 and spool bearing 46 and the line spool support surface 22, respectively. The spool bearing 46 is prevented from rotating relative to the body 12 by the interaction of the tabs 70 and the axial slots 74. Thus, the drag brake mechanism is not disrupted. Also, because the spool 39 rests on the spool bearing 46, the bushing 30 is not subject to torsion because spool bearing 46 which is frictionally fit to the bushing 30 is positively prevented from rotating by the tab 70 and axial slot 74 structure. Thus, rotation of the bushing 30 within the axial bore 28 of the cylindrical hub 14 and the possible loosening of the bushing 30 within the cylindrical hub 14 which commonly results in failure of the fishing reel 10 is prevented.

The spool bearing of the present invention provides a positive lock against rotation of the spool bearing and the bushing relative to the reel housing. By interaction of the tabs on the spool bearing and the notches in the hub the spool bearing is held in place without the necessity of an exacting and therefore expensive press fit as required by some prior art structures and without expensive drilling and pinning of the spool bearing as required by other prior art structures. As is evident from the description of the preferred embodiment, these advantages are provided by a spool bearing and a cooperating hub which need not be significantly modified from prior art structures and which does not render more difficult the assembly of a fishing reel. Thus, the spool bearing of the present invention solves a serious problem in conventional fishing reel construction in a more reliable and cheaper fashion than prior art solutions.

We claim:

1. In a fishing reel of the type having a reel frame body, there being a forwardly projecting cylindrical hub with a cylindrical bore therein on the reel frame body, and a cylindrical centershaft bushing inserted into the bore of the cylindrical hub with a portion of the bushing extending forwardly from the cylindrical hub, the centershaft bushing having a spool bearing fixedly mounted thereon, the reel further including a line spool having a cylindrical bore of predetermined diameter mounted on the spool bearing, an improved spool bearing comprising:

an annular body having a centershaft bushing receiving axial bore therein; and means integral with the annular body and separate from the centershaft bushing extending from the annular body for keyed connection to the reel frame body, the keyed connection to the reel frame body securing the spool bearing and the centershaft bushing from rotation relative to the reel frame body upon rotation of the normally non-rotatable line spool.

2. The improved spool bearing of claim 1 wherein the means for engaging comprises at least two radially spaced tabs extending axially and rearwardly from the annular body, the tabs being configured to be axially received within a corresponding number of notches in a forwardly facing edge of the cylindrical hub.

3. The improved spool bearing of claim 1 wherein the spool bearing is made of acetal.

4. In a fishing reel of the type having a reel frame body, there being a forwardly projecting cylindrical hub with a cylindrical bore therein on the reel frame body, and a cylindrical centershaft bushing with a centershaft receiving axial bore, the bushing being secured in the bore of the cylindrical hub with a portion of the centershaft bushing extending forwardly from the cylindrical hub, the centershaft bushing having a spool bearing fixedly mounted thereon, the reel further including a line spool having a cylindrical bore of predetermined diameter mounted on the spool bearing, means fixedly mounting the spool bearing to the reel frame body comprising:

an integral tab extending axially from the spool bearing; and an axial slot in the reel frame body for receiving the tab of the spool bearing to thereby prevent rotation of the spool bearing and the centershaft bushing relative to the reel frame body upon rotation of the line spool.

5. The means fixedly mounting the spool bearing of claim 4 wherein the slot in the reel frame body is in the forwardly facing edge of the cylindrical hub and the tab extends axially and rearwardly from the spool bearing.

6. The means fixedly mounting the spool bearing of claim 5 wherein the cylindrical hub has at least two radially spaced axial slots and the spool bearing has an identical number of correspondingly radially spaced tabs.

7. The means for fixedly mounting of claim 4 wherein the spool bearing is made of acetal.

8. In a fishing reel of the type having a reel frame body, there being a forwardly projecting cylindrical hub with a cylindrical bore therein on the reel frame body, and a cylindrical centershaft bushing inserted into the bore of the cylindrical hub with a portion of the bushing extending forwardly from the cylindrical hub, the centershaft bushing having a spool bearing fixedly mounted thereon, the reel further including a line spool having a cylindrical bore of predetermined diameter mounted on the spool bearing, an improved spool bearing comprising:

an annular body having a centershaft bushing receiving axial bore therein; and means extending from the annular body for keyed connection to the cylindrical hub, the keyed connection to the cylindrical hub securing the spool bearing and the centershaft bushing from rotation relative to the reel frame body upon rotation of the normally non-rotatable line spool.

9. The improved spool bearing of claim 8 wherein the means for engaging comprises at least two radially spaced tabs integral with and extending axially and rearwardly from the annular body, the tabs being configured to be axially received within a corresponding number of notches in a forwardly facing edge of the cylindrical hub.

10. The improved spool bearing of claim 8 wherein the spool bearing is made of acetal.

* * * * *